Patented July 25, 1939

2,167,327

UNITED STATES PATENT OFFICE

2,167,327
PROCESS FOR BREAKING PETROLEUM SUSPENSIONS

Samuel K. Talley and Carlos L. Gutzeit, Houston, Tex., assignors to Shell Development Company, San Francisco, Calif., a corporation of Delaware No Drawing. Application February 19, 1938, Serial No. 191,568

9 Claims. (Cl. 196—4)

This invention deals with a process for treating petroleum oil emulsions or suspensions containing alkaline earth metal ions, and more particularly is concerned with the breaking of crude oil emulsions and/or desalting of crude oils containing harmful quantities of halide salts.

Among the various types of petroleum oil emulsions, there are those in which the active emulsifying agent or agents comprise organic alkaline earth metal salts. It has already been proposed to break emulsions containing these emulsifying agents by adding thereto chemicals capable of forming water-insoluble alkaline earth metal compounds, on the theory that the elimination of the alkali earth metals in the form of insoluble salts destroys the emulsifiers, thereby breaking the emulsions. Thus, water softening agents, such as sodium carbonate, trisodium phosphate, various sodium soaps, etc., were added to effect the breaking of petroleum emulsions. In some few instances this method has proved fairly satisfactory, but in most cases the solids formed by the water softening agents accumulate at the oil-water interface and form secondary suspensions which prevent a complete separation of undissolved foreign matter from the oil.

It is a purpose of this invention to break emulsions of oil and water caused by alkaline earth salts, which accumulate at the water-oil interface. It is another purpose to break such emulsions so completely that the treatment may be carried out in continuous equipment without danger of accumulation of a secondary emulsion. It is a further purpose to wash out or precipitate suspensions of solids such as various salts in crude oils, stabilized by the presence of alkaline earth salts. Other purposes are to remove alkaline earth metals from the emulsions in water-soluble form, thereby avoiding secondary emulsions: to remove effectively and completely salts such as sodium, magnesium and calcium chlorides, which are highly injurious to distillation equipment, and to eliminate gypsum, clay, sand, etc., which are frequently suspended in the crude oil.

We have discovered that petroleum oils which are emulsified and/or contain solids suspended in relatively stable form owing to the presence of alkaline earth metal compounds capable of liberating ions, may be treated effectively to precipitate the emulsified and/or suspended solid matter by adding to the oils chemicals which keep the alkaline earth metal ions in aqueous solution in the form of complex compounds having extremely low ionization constants for the alkaline earth metal components. The presence of water in the treatment in an amount sufficient to dissolve the chemical is essential.

Chemicals having this property are the alkali metal metaphosphates and pyrophosphates. When used properly and within the correct limits meta- and pyro-phosphates are far more effective in promoting the above desired results than the reagents heretofore employed which cause precipitation of the alkaline earth metal ions in the form of water-insoluble salts. While in the treatment of emulsions, for instance, the latter produce secondary emulsions resulting in the formation of a middle layer of unbroken emulsion which will gradually accumulate, forming a by-product which is difficult to dispose of and upsets continuous operation of settlers, the alkali metal meta- and pyro-phosphates if used properly, not only avoid such secondary emulsions but are capable of resolving same, if formed. Thus, secondary emulsions produced upon treating primary emulsions with precipitants for alkaline earth metal ions, can be broken with the aid of alkali metal meta- and pyro-phosphates, but not by the addition of further amounts of the precipitants for alkaline earths.

The amounts of the alkali metal meta- and pyro-phosphates required to effect the desired breaking of emulsions and/or suspensions vary within very definite limits. In general, quantities between about .0005% to .05% and more often between .001% and .01% chemical by weight of the oil are satisfactory.

We have determined experimentally, both in the laboratory and on plant scale, that amounts below a certain minimum invariably lead to the formation of secondary emulsions or suspensions of a type similar to those formed when using precipitants. On the other hand, the use of amounts much greater than those stated, above not only is not economical, but often leads to inversion of emulsions.

In carrying out our process we usually add the chemical to the oil or emulsion in the form of a dilute aqueous solution, although if sufficient water is present to dissolve the chemical we may add it as a solid. Or we may mix the oil with an amount of water necessary to dissolve the chemical and separately add the chemical in solid form. Addition of the chemical as a solution is preferable as this method is more certain in evenly distributing the chemical throughout the suspension.

It is in general desirable if not essential that the temperature for effecting the break of the emulsion or suspension be as low as possible to avoid vaporization of light ends from petroleum oils, since pressure equipment for treating and settling is not usually available in places where such oils containing oil-insoluble matter must be treated. On the other hand, as is well known, settling is facilitated by increasing temperatures, and where crystallized wax is associated with suspensions such as is the case with Rhodessa and many other wax bearing crudes containing suspended salt, it may be impossible to obtain an effective separation of the salt from the oil at temperatures below the melting point of the wax. This temperature is usually between about 130° to 160° F.

We realize that attempts have been made in the past to break petroleum oil emulsions with meta- and pyro-phosphates, and the reported failures of these attempts were probably due to a failure to determine the effective amounts which must be adhered to quite strictly in order to resolve emulsions fully and completely.

It is of considerable importance that a laboratory method be available by which the effective amounts can be determined quickly and reliably. Chemical analysis of the emulsions to determine the content of alkali metal has proven impractical and unreliable as well. The method which we have devised and check against plant results on numerous occasions is a direct method of observing the emulsion or suspension under a standard set of conditions. We have found that the amount of reagent predicted from the test when added to the emulsion or suspension has always resulted in complete and satisfactory break. This method is as follows:

A 50 cc. sample of the petroleum oil or water-and-oil emulsion is placed in a large test tube with 10 cc. of water containing a definite amount of the meta- and/or pyro-phosphate. The tube is then placed in a water bath maintained at a temperature high enough to produce fairly rapid settling of the water from the oil, as determined by trials, for about ten minutes until the tube and contents come to the temperature of the bath. A blank test is made concurrently and it is usually convenient to make tests on several chemicals or several concentrations of chemicals at the same time in order to obtain comparative effects. After the tubes come to the temperature of the bath, they are stoppered tightly, quickly wrapped in a cloth to prevent rapid heat loss, and shaken vigorously by hand for exactly three minutes. The tubes are then returned to the bath and the settling is observed. The tubes must be perfectly clean before using, otherwise the oil clings to the glass and produces misleading results.

The correct temperature for the test is determined by allowing blanks, i. e., mixtures of the oil and water in the absence of chemical, to settle at various temperatures. A clear layer of water should separate, and the lowest temperature at which this occurs is the one to be used in the test, in order to evaluate the relative merits of the various emulsion or suspension breaking reagents. If water separates as a fine grained emulsion without forming a clear layer the temperature is too low and a higher temperature must be tried.

Whenever it appears from the comparison of the test tube containing chemical with the blank that the former settles more poorly than the blank, indications are that the amount and/or nature of the chemical were improper. Different amounts of the same chemical must be tried, and this may or may not result in a more satisfactory separation. If changing the amount of the same chemical fails to yield a satisfactory separation, other chemicals must be tried.

The behavior of the test samples containing chemicals is to be interpreted as follows:

1. The water separates out as a fine grained emulsion. Since at the chosen test temperature the blank separates a clear layer of water, the chemical has acted as an emulsifying agent. The concentration and/or nature of the chemical is improper.

2. The oil separates from the water but leaves a very coarse-grained emulsion; drops of water several centimeters in cross-section, separated by films of oil, are obtained. This condition shows poor settling but not the formation of a permanent emulsion; it has been found that such emulsions are unstable and will not build up under flow conditions. It is to be noted that if the tubes are not absolutely clean before using, these coarse-grained emulsions will be observed to form irregularly. The effect of a dirty tube is readily detected by the fact that the oil films cling to the glass only in certain spots. If the blank shows this emulsion while samples to which the chemical has been added do not, the chemical has improved the settling; if the blank shows less emulsion or settles more rapidly than the samples containing chemical, the addition of the chemical has stabilized the emulsion.

3. The oil separates from the water, but leaves a thin film of light colored, fine grained material at the interface which does not disappear after ten to twenty minutes standing. Sometimes solid particles may be observed at the interface. This condition shows the formation of emulsions which would build up slowly in continuous plant settlers and is of the greatest detriment in water washing processes. The emulsion film may vary from a mere trace to a layer several millimeters in thickness, depending on the severity of the condition and the amount of chemical used.

4. The water and oil separate cleanly and leave no emulsion at the interface. This condition corresponds to good settling. If such settling is obtained in all of the tubes, the test must be repeated at a lower temperature. If the blank settles clear while samples containing chemicals do not, the chemicals act as emulsifying agents and other chemicals or different amounts of the same chemical must be tried. If the blank does not settle clear while samples containing chemicals settle clear, the chemicals have broken the emulsion.

The proper amount of the reagent thus determined in accordance with the above method is now dissolved in water, and the resulting solution is agitated with the petroleum oil. Addition of the solution to the oil may be in batch or continuous, the quantities required to obtain a certain result being the same. Solutions must be freshly prepared because upon standing the meta- and pyro-phosphates tend to become hydrated and are converted to the ortho-phosphate which acts as an ordinary precipitant for alkaline earth metal ions.

In the following series of illustrative examples crude petroleum oils were treated with the reagents of both types, i. e., those keeping alkaline earth metal ions in complex solution and those precipitating same. A commercial meta-phosphate known as "Hagans" phosphate used in these examples consisted of 93% sodium metaphosphate and 7% of sodium pyro-phosphate. The procedure of the tests was that already described.

Example I

Rodessa crude.—This is a crude of high, variable salt content, containing predominantly sodium chloride.

1. Chemical: 0.001% by weight of the oil; temperature: 140° F. Blank: Trace of emulsion which persists for more than 30 minutes. Sodium metaphosphate: Clear except for trace emulsion after less than 10 minutes. Sodium pyrophosphate: Clear except for trace emulsion after less than 10 minutes. "Hagans" phosphate: Clear except for trace emulsion after less than 10 minutes. Trisodium phosphate: Fair settling; some emulsion after 30 minutes. Sodium carbonate: Fair settling; some emulsion after 30 minutes.

The pyro- and meta-phosphates, including "Hagans" phosphate, show improved settling. Trisodium phosphate and sodium carbonate show poor settling. All conditions lead to emulsions in continuous plant equipment. This was verified by plant observation.

2. Chemical: 0.005% by weight of the oil; temperature: 140° F. Blank: Emulsion layer which does not break in 30 minutes. Sodium metaphosphate: Clear less than 1 minute; no emulsion. Sodium pyrophosphate: Clear less than 1 minute; no emulsion. "Hagans" phosphate: Clear less than 1 minute; no emulsion. Trisodium phosphate: Settles clear; stable emulsion of 5% of the oil. Sodium carbonate: Settles clear; stable emulsion of 5% of the oil.

The pyro- and meta-phosphates, including "Hagans" phosphate, show improved settling and will prevent emulsions in continuous plant equipment, as verified by observation of plant settlers. Trisodium phosphate and sodium carbonate lead to emulsions very rapidly in the plant equipment.

3. Chemical: 0.01% by weight of the oil; temperature: 160° F. Blank: Trace emulsion which persists for more than 10 minutes. Sodium metaphosphate: Clear less than 1 minute; no emulsion. Sodium pyrophosphate: Clear less than 1 minute; no emulsion. "Hagans" phosphate: Clear less than 1 minute; no emulsion. Trisodium carbonate: Settles clear, emulsion of 5% of the oil. Sodium carbonate: Settles clear; emulsion of 10% of the oil.

Conclusions as under 2; sodium carbonate worse than trisodium phosphate.

From the several tests it may be concluded that the addition of sodium meta- or pyro-phosphate or their mixtures, including "Hagans" phosphate, decrease emulsion stability and improve settling for Rodessa crude provided the concentration (for this sample of Rodessa crude) exceeds 0.001% by weight of the oil. Sodium metaphosphate is better than sodium pyrophosphate.

Example II

Van Zandt and Rodessa crudes of medium salt content.

1. Chemical: 0.001% by weight of the oil; temperature: 140° F. Blank: Settles fastest but leaves trace of emulsion. Sodium metaphosphate: Settling rate 2nd; trace emulsion. Sodium pyrophosphate: Settling rate 3rd; trace emulsion. "Hagans" phosphate: Settling rate 4th; trace emulsion. Trisodium phosphate: Settling rate 5th; heavy emulsion. Sodium carbonate: Settling rate 6th; heaviest emulsion.

All conditions lead to emulsions in continuous plant equipment, as verified. Trisodium phosphate and sodium carbonate are definitely deleterious.

2. Chemical: 0.01% by weight of the oil; temperature: initially 140° F., finally 160° F. Blank: Settles in 1 minute 140° leaving emulsion; at 160° F. a clear layer of water is separated. Sodium metaphosphate: Clear in 1 minute; emulsion breaks at 160° F. Sodium pyrophosphate: Clear in 3 minutes; trace emulsion at 160° F., 10 minutes. "Hagans" phosphate: Clear in 1 minute; emulsion breaks at 160° F., 10 minutes. Trisodium phosphate: Fairly clear; heavy emulsion after 10 minutes, 160° F. Sodium carbonate: Fairly clear; very heavy emulsion after 10 minutes, 160° F.

Temperature 140° F. leads to emulsion in all cases; metaphosphates and "Hagans" phosphate are satisfactory at 160° F. and proved satisfactory in plant settler by direct observations; pyrophosphate doubtful; trisodium phosphate and sodium carbonate definitely lead to emulsions in plant equipment.

Example III

East Texas crude.—Fairly low in salt content.

1. Chemical: 0.001% by weight of the oil; temperature: 140° F. Blank: Settles fastest, no emulsion. "Hagans" phosphate: Settling rate 2nd; no emulsion. Trisodium phosphate: Settling rate 3rd; trace emulsion. Sodium carbonate: Settling rate 4th; heavy emulsion. Sodium metaphosphate: Settling rate 5th; no emulsion. Sodium pyrophosphate: Settling rate 6th; no emulsion.

Although sodium carbonate and trisodium phosphate produce more rapid settling than the meta- and pyro-phosphates, their use will lead to the formation of stable emulsions in continuous plant equipment. Meta- and pyro-phosphates do not improve settling rates but they may be used to remove calcium and magnesium without the formation of emulsions.

2. Chemical: 0.01% by weight of the oil; temperature: 140° F. Blank: Breaks clean in 3 minutes, no emulsion. Sodium metaphosphate: Clear in 1 minute; no emulsion. Sodium pyrophosphate: Clear in 1 minute; no emulsion. "Hagans" phosphate: Clear in 1 minute; no emulsion. Trisodium phosphate: Breaks in 3 minutes; heavy emulsion. Sodium carbonate: Breaks in 3 minutes; very heavy emulsion.

Sodium meta- and pyro-phosphates and "Hagans" phosphate improve settling and will prevent emulsion formation in continuous plant equipment. Trisodium phosphate and sodium carbonate will lead to emulsions very rapidly in plant equipment.

From the tests it may be concluded that the addition of sodium meta- or pyro-phosphates or their mixtures improves settling for East Texas crude, provided the concentration exceeds 0.001% by weight of the oil. Sodium pyro-phosphate is better than the meta-phosphate or "Hagans" phosphate.

Example IV

West Texas crude.—A mixed crude high in sodium chloride and gypsum. The crude is sour.

1. Chemical: 0.001% by weight of the oil; temperature: 160° F. Sodium carbonate: Settles fairly clear in 5 minutes; slight permanent emulsion. Sodium pyrophosphate: Settling rate 2nd; 50% coarse emulsion. Blank: Settling rate 3rd; fair settling 10 minutes, slight emulsion. Trisodium phosphate: Settling rate 4th; 100% coarse emulsion. Sodium metaphosphate: Settling rate 5th; 100% coarse emulsion. "Hagans" phosphate: Settling rate 6th; slight permanent emulsion.

Alkaline reagents improve settling in West Texas crude; the temperature of the tests is slightly low as judged from the blank. This is necessary because of the vaporization of the crude.

2. Chemical: 0.01% by weight of the oil; temperature 160° F. Sodium pyrophosphate: Clear separation, no emulsion. Blank: Settling rate 2nd; 50% coarse emulsion. Sodium carbonate: Settling rate 3rd; slight permanent emulsion. Trisodium phosphate: Settling rate 4th; no emulsion. Sodium metaphosphate: Settling rate 5th; slight coarse emulsion. "Hagans" phosphate: Settling rate 6th; no emulsion.

As for concentration .001%, alkaline reagents improve settling. Sodium pyro-phosphate is alkaline and is a reagent for the formation of soluble complexes with the alkaline earths. Its ability to increase the rate of settling as well as to effect complete settling places it at the top of the list over other chemicals for this type of crude.

Summing up, West Texas crude shows best settling rates with alkaline reagents; at high concentrations the effect of secondary emulsions decreases the effectiveness of typical precipitants. Only the pyro- and meta-phosphates may be used safely in continuous plant equipment; the pyrophosphate is referred because of its alkalinity. "Hagans" phosphate may be used.

While in the foregoing examples sodium salts only have been used for treating, it is understood that other alkali metal salts such as lithium and potassium are equally effective, provided sufficient water is present to dissolve them.

We claim as our invention:

1. In the process of liberating petroleum oil from a relatively stable mixture containing said oil and oil-insoluble matter comprising an alkaline earth metal salt which mixture by the addition of ortho phosphates forms secondary mixtures incapable of resolution by further addition of ortho phosphates, the steps of treating said mixture with an alkali metal phosphate selected from the group consisting of meta- and pyro-phosphates in an amount between .0005% to .05% by weight of the oil, in the presence of an amount of water sufficient to dissolve the chemical whereby the mixture is broken without forming secondary mixtures.

2. In the process of liberating petroleum oil from a relatively stable mixture containing said oil and oil-insoluble matter comprising an alkaline earth metal salt which mixture by the addition of ortho phosphates forms secondary mixtures incapable of resolution by further addition of ortho phosphates, the steps of treating said mixture with an alkali metal phosphate selected from the group consisting of meta- and pyro-phosphates in an amount between .001% to .01% by weight of the oil, in the presence of an amount of water sufficient to dissolve the chemical whereby the mixture is broken without forming secondary mixtures.

3. In the process of desalting a crude oil containing solid salt in relatively stable suspension comprising an alkaline earth metal salt which suspension by the addition of ortho phosphates forms secondary suspensions incapable of resolution by further addition of ortho phosphates, the steps of adding to said oil an alkali metal phosphate selected from the group consisting of meta- and pyro-phosphate in an amount between .0005% to .05% by weight of the oil, and water in an amount sufficient to dissolve the chemical whereby the suspension is broken without forming secondary suspensions.

4. In the process of breaking crude petroleum oil water emulsions containing an alkaline earth metal salt which emulsion by the addition of ortho phosphates forms secondary emulsions incapable of resolution by further addition of ortho phosphates, the step of adding to the emulsion an alkali metal phosphate selected from the group consisting of meta- and pyro-phosphates in an amount between .0005% to .05% by weight of the oil in the emulsion whereby the emulsion is broken without forming secondary emulsions.

5. The process of claim 1 in which the alkali metal phosphate is a sodium metaphosphate.

6. The process of claim 1 in which the phosphate is a mixture of about 93% meta- and 7% pyro-phosphate.

7. The process of claim 1 in which the phosphate is added in the form of a dilute aqueous solution.

8. In the process of liberating wax bearing petroleum oil from a relatively stable mixture containing said oil and an oil-insoluble matter comprising an alkaline earth metal salt which mixture by the addition of ortho phosphates forms secondary mixtures incapable of resolution by further addition of ortho phosphates, the steps of treating said mixture with an alkali metal phosphate selected from the group consisting of meta- and pyro-phosphates in an amount between .0005% to .05% by weight of the oil at a temperature just above the melting point of the wax, in the presence of an amount of water sufficient to dissolve the chemical whereby the mixture is broken without forming secondary mixtures.

9. The process of claim 8 in which the temperature is between 130° to 160° F.

SAMUEL K. TALLEY.
CARLOS L. GUTZEIT.